United States Patent
Moore

(10) Patent No.: US 6,880,124 B1
(45) Date of Patent: Apr. 12, 2005

(54) METHODS OF STORING AND RETRIEVING INFORMATION, AND METHODS OF DOCUMENT RETRIEVAL

(75) Inventor: Keith E. Moore, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/325,910

(22) Filed: Jun. 4, 1999

(51) Int. Cl.⁷ .............................................. G06F 17/00
(52) U.S. Cl. ..................... 715/511; 717/170; 382/306; 283/74
(58) Field of Search ......................... 715/511; 717/170; 382/306; 283/74; 707/511

(56) References Cited

U.S. PATENT DOCUMENTS

| | | | |
|---|---|---|---|
| 4,243,694 A | | 1/1981 | Mansukhani |
| 4,985,930 A | * | 1/1991 | Takeda et al. ............... 358/452 |
| 5,093,147 A | | 3/1992 | Andrus et al. |
| 5,692,073 A | * | 11/1997 | Cass ........................... 382/219 |
| 5,735,547 A | | 4/1998 | Morelle et al. |
| 5,806,078 A | * | 9/1998 | Hug et al. ................... 707/203 |
| 5,853,197 A | | 12/1998 | Mowry, Jr. et al. |
| 5,913,542 A | * | 6/1999 | Belucci et al. ................ 283/70 |
| 6,104,834 A | * | 8/2000 | Hull ........................... 382/190 |
| 6,192,165 B1 | * | 2/2001 | Irons ........................... 382/306 |
| 6,203,069 B1 | * | 3/2001 | Outwater et al. .............. 283/81 |
| 6,249,716 B1 | * | 6/2001 | Edens et al. ............. 270/52.02 |
| 6,327,599 B1 | * | 12/2001 | Warmus et al. ............. 715/517 |
| 6,330,082 B1 | * | 12/2001 | Oliver ......................... 358/473 |
| 6,405,223 B1 | * | 6/2002 | Kelley et al. ................ 707/203 |
| 6,412,699 B1 | * | 7/2002 | Russell et al. ............... 235/375 |

* cited by examiner

Primary Examiner—Joseph Feild
Assistant Examiner—Rachna Singh

(57) ABSTRACT

In one aspect, the invention encompasses a method of information storage and retrieval. A first communication is stored as data in a database with an identifier code. At least a portion of the data corresponding to the first communication is sent to a printer which prints a portion of the first communication together with the identifier code on a substrate. The first communication printed on the substrate is changed to form a second communication which is different from the first communication. The second communication is scanned with a scanning machine which digitizes the second communication and also digitizes the identifier code that had been printed on the substrate. Information is extracted from the digitized identifier code with a processor. The processor is in data communication with the database and is configured to utilize the extracted information to retrieve the first communication from the database. The digitized second communication is compared with the data of the first communication to identify differences between the second communication and the first communication.

11 Claims, 4 Drawing Sheets

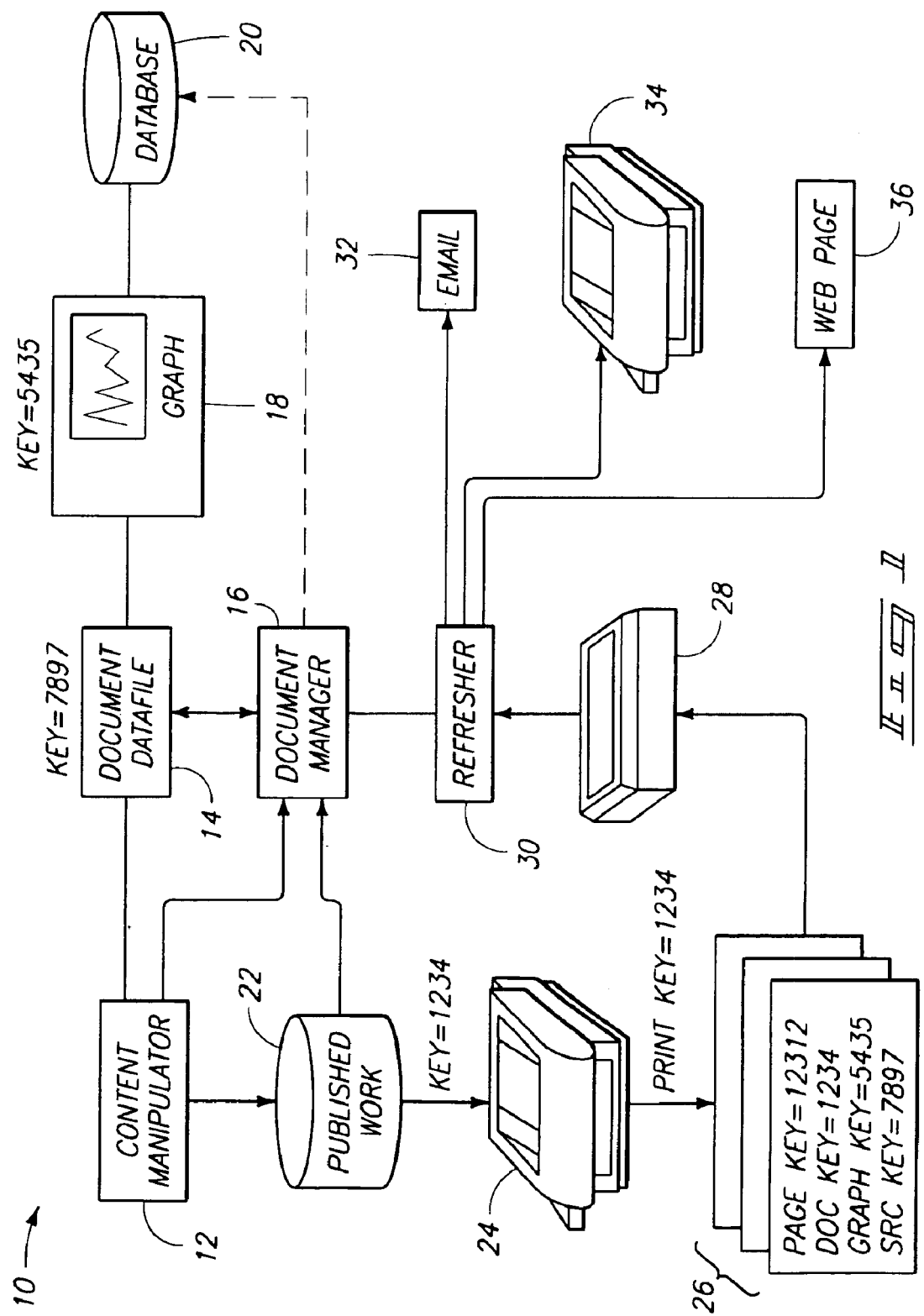

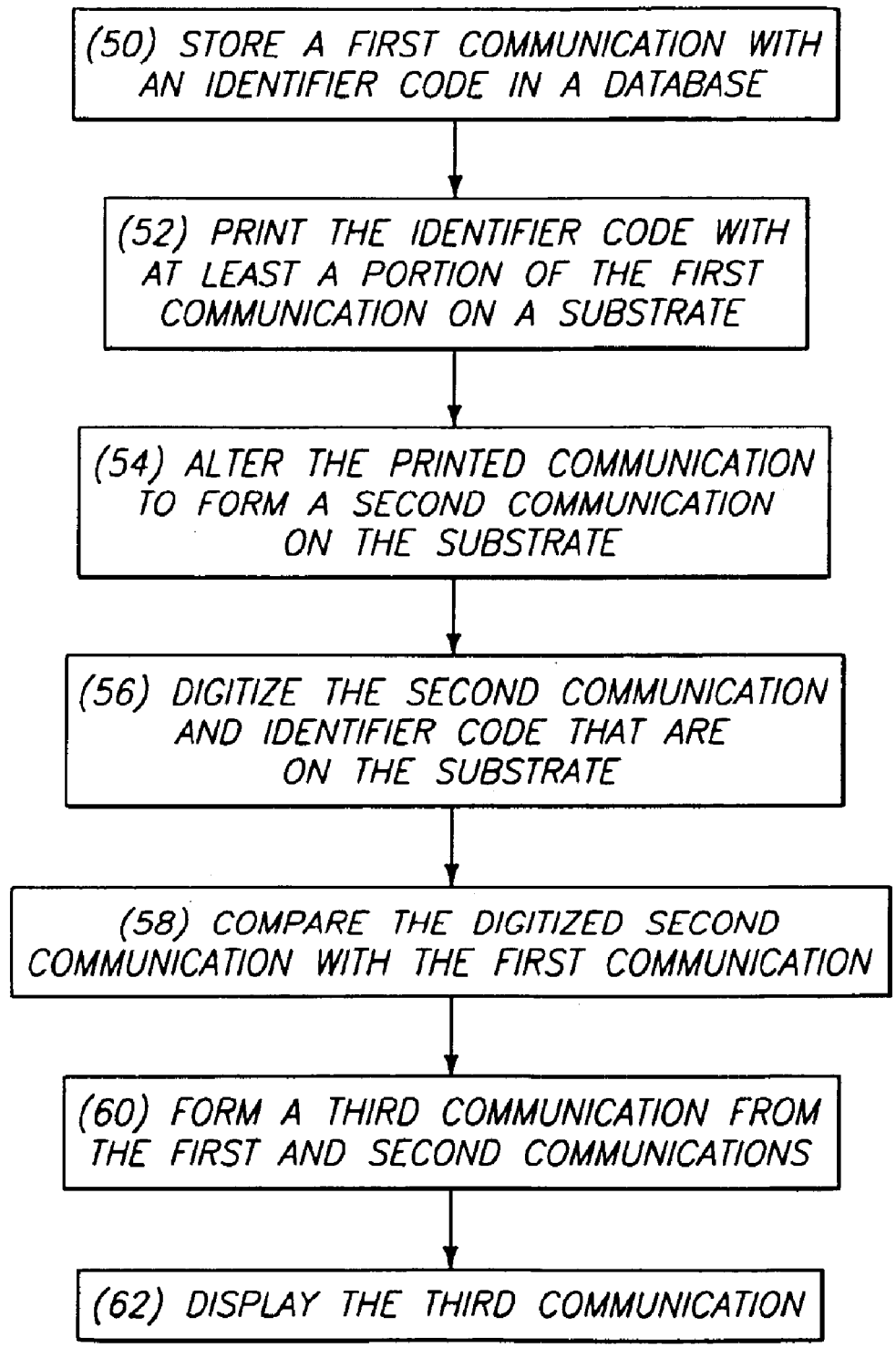

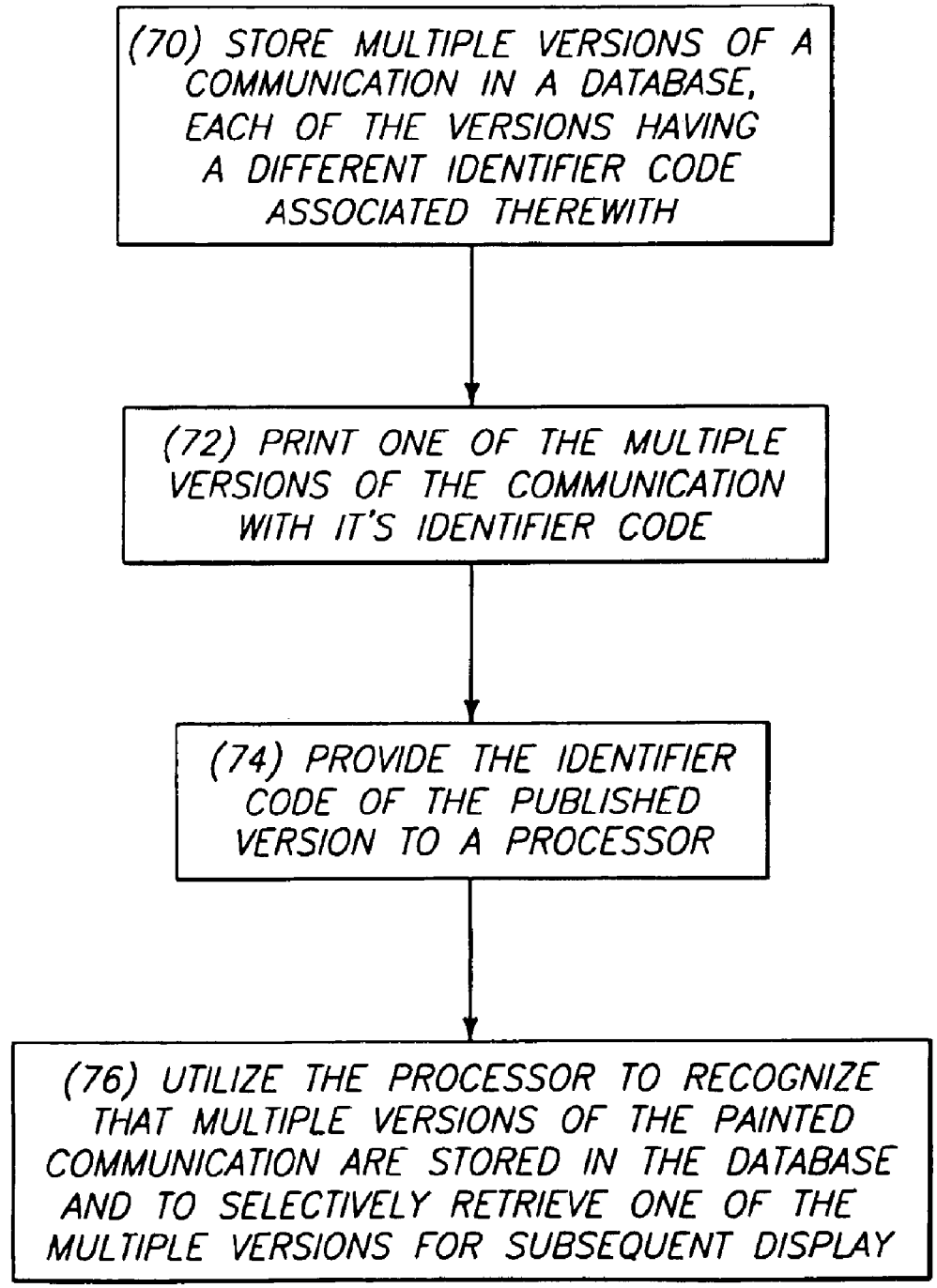

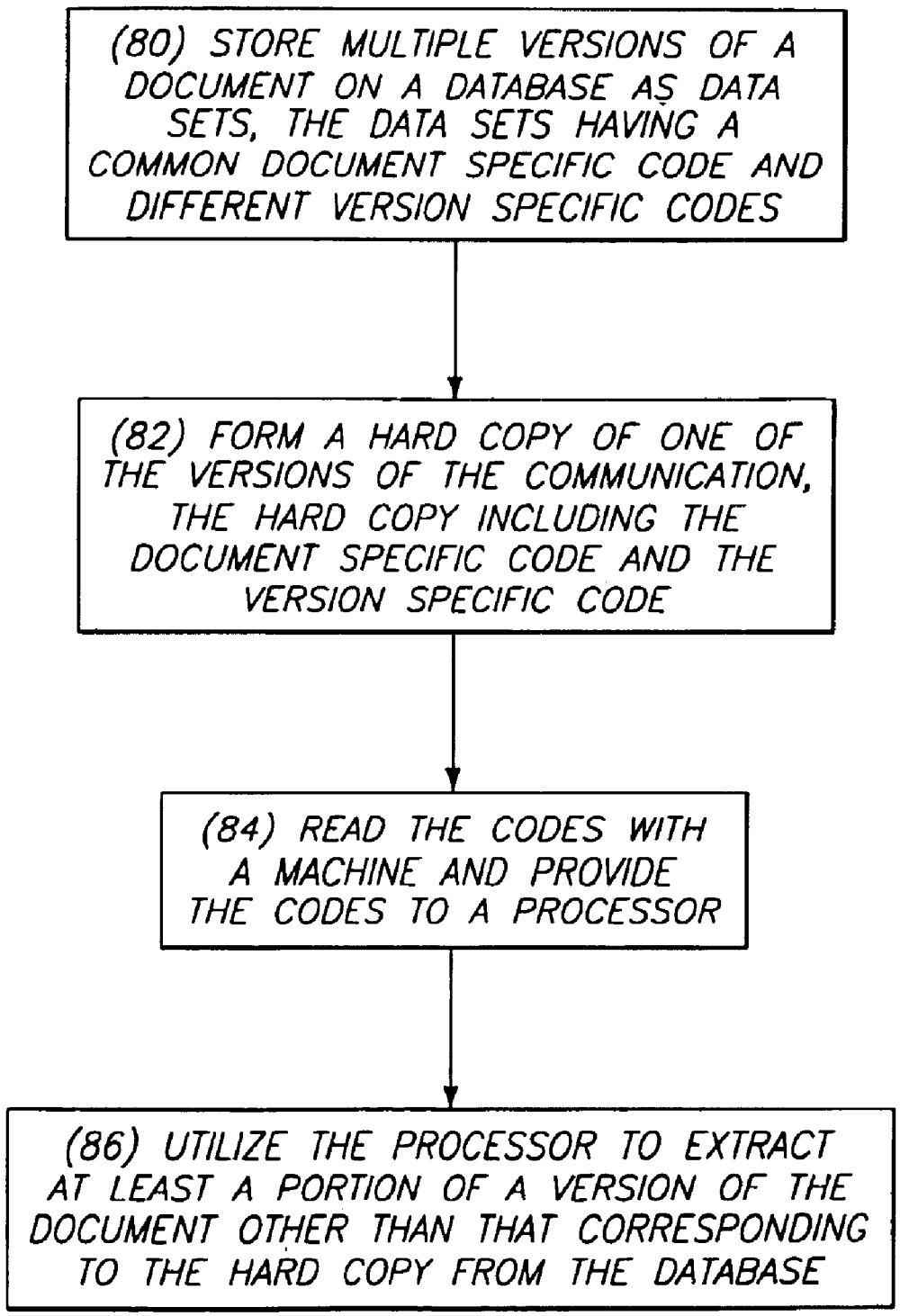

METHODS OF STORING AND RETRIEVING INFORMATION, AND METHODS OF DOCUMENT RETRIEVAL

FIELD OF THE INVENTION

The invention encompasses methods and apparatuses for storing and retrieving information, such as, for example, communications. In a particular aspect, the invention encompasses methods for document retrieval using electronic networks.

BACKGROUND OF THE INVENTION

A continuing challenge to modern society is to improve methods and apparatuses for information transfer. Particular challenges are associated with communication transfer. For purposes of interpreting this document and the claims that follow, the term "communication" is defined to encompass information which is passed from one human to another. Communications can be, for example, in the form of textual and/or graphic representations.

Several mechanisms are presently available for passing textual and/or graphical information from one human to another. Such mechanisms include large-scale distribution mechanisms, such as, for example, publication of books, newspapers and periodicals. Communications can also be formed and transferred by office equipment, such as with fax machines and copiers. Fax machines and copiers reproduce a hard copy of a communication, and, in the case of the fax machine, transmit an electronic version of the hard copy to a distant location prior to reproduction of the hard copy. Other mechanisms for distributing communications include electronic mail (e-mail) and network communications. A network which is achieving increasing popularity is the global Internet, which is a network extending across countries in both hemispheres of the globe. The World Wide Web (the Web) is a portion of the global Internet having hypertext-enabled pieces of information. The information on the web is communicated in many formats, including multimedia formats (such as video and audio information), as well as textual and graphical formats. Information on the web is provided with an address, such as, for example, a uniform resource location (URL), which can be utilized to locate the information on the web.

A difficulty with all of the above-described mechanisms for passing communications between persons is that it can be difficult, and frequently impossible, for a person receiving the communication to know if the particular communication is a most recently updated version of the communication or if there is a more updated version available. Another difficulty can be that if a person only receives a portion of a communication, it can be difficult, and frequently impossible, to find the rest of the communication. It would be desirable to develop methodologies and mechanisms which overcome the above-discussed limitations associated with present methods of communication transfer.

SUMMARY OF THE INVENTION

In one aspect, the invention encompasses a method of storing and retrieving information. A first communication is stored as data in a database. The storing of the first communication utilizes software configured to save an identifier code associated with the first communication data in the database. At least a portion of the data corresponding to the first communication is sent to a printer which prints a portion of the first communication together with the identifier code on a substrate. The first communication printed on the substrate is changed to form a second communication which is different from the first communication. The second communication is scanned with a scanning machine which digitizes the second communication and also digitizes the identifier code that had been printed on the substrate. Information is extracted from the digitized identifier code with a processor. The processor is in data communication with the database and is configured to utilize the extracted information to retrieve the first communication from the database. The digitized second communication is compared with the data of the first communication to identify differences between the second communication and the first communication. Such differences can be incorporated into a third communication which displays the differences.

In another aspect, the invention encompasses a method of document retrieval. A database is provided. The database has multiple versions of a document stored therein as data sets. The multiple versions have a common document specific code associated therewith in the database, and have different version specific codes. A hard copy of one of the versions of the document is formed. The hard copy version is defined as a first version of the document, and has the common document specific code provided thereon in machine-readable format. The hard copy version also has the version specific code provided thereon in machine-readable format. The machine-readable format of the hard copy version is read with a code-reading machine configured to extract the document specific code and version specific code from the machine-readable format. The document specific code and version specific code are provided to a processor in data communication with the database. The processor is configured to extract at least a portion of a second version of the document from a data set corresponding to the second version of the document, wherein the second version is different than the first version.

DESCRIPTION OF THE DRAWINGS

FIG. 1 is a diagrammatic view of a system encompassed by the present invention.

FIG. 2 is a block-diagram view of a first embodiment method encompassed by the present invention.

FIG. 3 is a block-diagram view of a second embodiment method encompassed by the present invention.

FIG. 4 is a block-diagram view of a third embodiment method encompassed by the present invention.

DETAILED DESCRIPTION OF THE INVENTION

The invention comprises apparatuses and method for retrieving and publishing communications. In particular aspects, the invention comprises forming coded keys on communications and electronically storing the keys with data corresponding to the communications in a database. The invention can advantageously enable a person to determine if information in a hard copy communication has been updated since formation of the hard copy (i.e., if there is an updated version of the communication stored in a database). Further, the invention can advantageously enable a person to obtain and/or distribute complete versions of a communication in situations wherein the person is initially provided with only a fragment of the communication.

Particular aspects of the present invention can be understood with reference to FIG. 1, which illustrates a system 10 encompassed by the present invention. System 10 utilizes a content manipulator 12 to generate at least a portion of a communication. Content manipulator 12 can comprise, for example, a software package (such as, for example, Microsoft Word™, Corel WordPerfect™, or Microsoft Excel™). Content manipulator 12 is utilized to create a communication, and the particular software utilized for content manipulator 12 will vary depending on the type of communication. The communication type can comprise, for example, a graphics display, a textual display, a spreadsheet display, a video display, an audio file, or a combination of one or more of the above-described displays and files.

In the embodiment of FIG. 1, content manipulator 12 produces a document data file 14 comprising the communication. Document data file 14 is passed to a document manager 16 (which can be, for example, a database), and has a code associated therewith. The code is preferably automatically generated (i.e., generated without user intervention), and can be generated by, for example, content manipulator 12, or software associated with document manager 16. The code is illustrated as a key number. Such key number preferably comprises a plurality of digits, with one or more of the digits being specific for the document, and at least one other of the digits being specific for the version number of the document. Other digits can indicate a database address where the document is stored, a source of the document, and a time at which the document was stored.

In particular embodiments, document manager 16 can comprise a network, or a location on a network. In a specific application of the present invention, document manager 16 comprises a location on the Internet. In such specific application, the code associated with document data file 14 can comprise a URL address of the storage location of document data file 14 on the Internet.

Document data file 14 can comprise sub-portions corresponding to particular components of the document. In the shown embodiment, a sub-portion corresponds to data associated with a graph 18. Graph 18 has a key code number associated therewith, which is different than the key code number associated with the remainder of document 14. The key code number associated with graph 18 can indicate a version of the graph, a source of the graph, and a time at which the data associated with the graph was updated and stored. Graph 18 can be separately updatable relative to the rest of document 14. Accordingly, an update of document data file 14 to form a new version of the document data file can, in particular applications, not correspond to an update of graph 18 within document 14. Graph 18 is shown associated with a database 20 which is separate from document manager 16. In particular applications, database 20 and document manager 16 can comprise the same database, or network. In other applications, database 20 can be separate from document manager 16. In applications in which database 20 is physically separated from document manager 16, it is preferred that database 20 remain in data communication with document manager 16.

Referring still to FIG. 1, content manipulator 12 is configured to send the data file to a location 22 which directs the data file to become a published work, in addition to sending a data file of document 14 to document manager 16. In the shown embodiment, location 22 comprises a printer 24 which prints information from the document data file on a substrate to form a hard copy communication 26 (the hard copy can also referred to as a "document" 26). Key codes are also printed on the substrate. The substrate can comprise, for example, paper or transparency stock. In the shown embodiment, the key codes are illustrated as a series of digits. In other embodiments, the key codes can comprise machine-readable code. In particular embodiments, the key codes can be hidden or camouflaged on the substrate, or generated from the substrate such as from noting the position of threads in the substrate or some other unique substrate identification. In particular applications the key codes can be provided as half-tone print, or in the form of ink which is invisible when viewed with only visible wavelength light. In other particular embodiments, the key codes can be provided in the form of bar codes.

The key codes printed with the document can identify, for example, the page number of the document in a particular publication, the source of the document, the storage location of the document data file on document manager 16, the locations and version numbers of any embedded and separately updatable materials within the communication (such as, for example, the shown graph 18), and the finishing (or job ticket) associated with hard copy communication 26. By "finishing" it is meant processing occurring during or after the printing of communication 26, such as, for example, stapling, binding or punching. Exemplary finishing operations include, binding on the left, hole-punching, stapling at a top left corner, glueing and finishing a spine, duplex printing, forming a cover page, and reduced size printing (reduced size printing includes, for example, two-up or four-up printing wherein two or four pages of text are reduced in size to fit on a single printed page). System 10 can comprise additional equipment (not shown) configured to accomplish various finishing operations. By having particular key codes identify finishing operations, and by providing equipment within system 10 that is configured to accomplish various finishing operations, system 10 can be configured to prompt a user of to indicate if one or more particular finishing operations are desired (such as, for example, any finishing operations originally utilized with the published document), and to automatically perform such finishing operations in response to input from the user.

Although the publication of communication 26 is described above as formation of a hard copy, it is to be understood that publication can comprise other forms of displaying the information of communication 26, including, for example, sending the communication in an e-mail, and incorporating the communication into a web page.

The publication of a communication from content manipulator 12 can act as a "freeze point", with the software associated with publication of the document being configured to immediately save the published version of the document to document manager 16. In a sense the source document 14 is a "live" document which can be updated and changed, and the document published at location 22 is a fixed (or snapshot) representation of source document 14 at one moment in time.

In preferred embodiments of the invention, if successive versions of communication 26 are formed, such versions will be separately stored on document manager 16, so that any of the multiple versions can be independently accessed within document manager 16.

The key codes associated with communication 26 enable a number of preferred aspects of the present invention to be realized. In particular applications of the invention, the key codes are machine-readable. Accordingly, communication 26 can be scanned with a scanner 28 configured to digitize communication 26 and to extract information from the machine-readable key codes provided with communication 26 on the substrate. Scanner 28 can be a hand held device, such as, for example, a personal digital assistant (PDA), or a larger device into which the substrate is fed. Scanner 28 can be utilized to scan an entirety of communication 26, or just a portion of communication 26. In particular embodiments, scanner 28 is utilized to scan only the portion of communication 26 comprising the key codes.

Scanner 28 is in data communication with a processor 30 (which is referred to as a "refresher" in FIG. 1). Refresher 30 is in data communication with document manager 16, and is preferably configured to utilize information extracted from the key codes of a scanned communication to ascertain if multiple versions of the communication are available through document manager 16 (i.e., if multiple versions are stored on either document manager 16, or a database in data communication with document manager 16). Refresher 30 can be separate from scanning machine 28 or incorporated into the scanning machine. In embodiments in which scanning machine 28 is a PDA, data can be transferred from the PDA to a computer terminal which is in turn in data communication with document manager 16.

Although in the above-described embodiment the key codes are machine-readable and provided to refresher 30 through a scanning machine, it is to be understood that the key codes can also be provided to be human-readable, and can be provided to refresher 30 through human input, such as, for example, voice input or tactile input.

Refresher 30 is preferably configured to prompt a user with information indicating if multiple versions of the document, or portions of the document, are accessible through document manager 16, and to request information on which of the multiple versions is to be output to a display device. The prompt can be in the form of, for example, a graphical display, textual display, or synthesized voice. The user request of which of the multiple versions is to be output to a display device can be provided through, for example, voice or tactile input devices. Alternatively, the user can indicate if only a sub-component of a document is to be output to a display device. For instance, a user could request that only graph 18 be output to a display device.

Refresher 30 sends data corresponding to the document version requested by the user to one or more output devices to display or send on the requested document version. The document version can correspond to, for example, a version stored as the source 14 or a published at location 22. In the shown embodiment, the output devices are an e-mail display device 32 (which can be a device that forwards the document version as an e-mail), a printer display device 34, and a web page display device 36.

An aspect of the present invention can be understood by recognizing that scanner 28, refresher 30, and one or more of the output devices (32, 34, or 36) together comprise a sort of "copier" which utilizes a hard copy communication 26 as input, and which outputs either an exact reproduction of the communication, or an entirely different version of the communication.

In particular applications, a processor associated with refresher 30 can be configured to identify if a different version of a scanned communication is accessible through document manager 16, and to generate a new communication comprising differences between the scanned communication and a particular version of the communication accessible through document manager 16. The new communication (a so-called difference document) can then be output to one or more display devices in communication with refresher 30. Such output of a difference document can be useful to, for example, identify what has changed between an input hard copy communication 26 and subsequent versions of the communication found associated with document manager 16.

System 10 of FIG. 1 can be utilized in a number of applications in addition to those described above. For instance, the system of FIG. 1 can be utilized for dispersement of quarterly reports to members of a group. In such embodiment, multiple versions of the quarterly report can be stored on document manager 16. Each version of the report will have a code common to the quarterly reports and identifying them as quarterly reports, and another code specific to each version of the quarterly report. A person can obtain a hard copy of the quarterly report and scan it with machine 28. Preferably, the codes associated with the quarterly report will be printed on the hard copy of the quarterly report in machine-readable code. Machine 28 can then digitize the machine-readable code, and, in combination with refresher 30, extract information from the code to locate the multiple versions of the quarterly report on document manager 16. Refresher 30 can then indicate to a user that multiple versions of the quarterly report are accessible through document manager 16, and that some of the versions are more recently updated than the version of the scanned hard copy. The user can then request that one of the more recent versions of the quarterly report be output to a display or print device. The user could request, for example, that the more recent version be e-mail dispersed throughout the group. A difference between sending files corresponding to source 14 and that published from location 22 can occur in the form of the file as well as in the version. In particular embodiments, one of source 14 and the file published at location 22 can correspond to a postscript/PDF file, and the other can correspond to an original Microsoft Word™ document.

In another application of the invention, a published document can be altered, by, for example, editing or partial destruction (such as, for example, tearing), and compared to an unaltered document on a database. Specifically, as long as the key codes remain associated with the altered document, a person can provide such key codes to refresher 30 to obtain an unaltered version of the document. In a particular embodiment of this aspect, a document can be altered by providing handwritten edits on the document, and the key codes can be provided in machine-readable form. The altered document can then be scanned with machine 28 and the handwritten edits digitized. Refresher 30 can then utilize the key codes to obtain a new document (possibly a different version of the communication than that which was scanned), and to combine such version of the document with the edits to output a new document having the edits incorporated into a displayed output communication. For instance, in a particular embodiment, a published communication may correspond to a color document. Subsequently, the document may be altered by forming black and white copies of the document and scrawling handwritten notes across the black and white copies. The black and white copies can then be scanned with a scanner/copier 28 to digitize the handwritten edits, as well as to provide the document identification codes to refresher 30. Refresher 30 could then obtain a color version of the document from document manager 16, and combine such color version with the digitized handwritten edits to form a new document corresponding to a color document having the handwritten edits provided thereon. Such new color document could then be output to, for example, either e-mail, a web page, or a color printer. The handwritten additions can be recognized because of the above-described ability of the system 10 to fetch and compare against an original document.

Particular aspects of the invention are next described with reference to the block diagrams of FIGS. 2–4. Referring to FIG. 2, the invention encompasses a method wherein a first version of a communication is printed and altered to form a second version, and wherein the second version is subsequently digitized and compared to the first version. More specifically, and with reference to step (50) of FIG. 2, a communication is stored with an identifier code in a database. Such storing can be accomplished utilizing software specifically configured to automatically save an identifier code with a communication when the communication is stored in a database. In particular applications, the software can be utilized in conjunction with other software which forms the communication (such other software can comprise, for example, word processing software, graphics-forming software, or multimedia-forming software) and can be configured to automatically save the communication to a database when the communication is printed.

In step (52), at least a portion of the communication is printed together with the identifier code. The printing of the communication comprises printing the identifier code and at least a portion of the communication on a substrate. Generally, the communication will be stored as data in a database, and the printing will comprising sending at least a portion of the data from the database to a printer to print the portion.

Referring to step (54), the printed communication is altered to form a second communication on the substrate. The alteration of the printed communication can comprise, for example, editing the printed communication, or destroying a portion of the printed communication. The alteration can further comprise, for example, removing a portion of the substrate having a portion of the first communication thereon, and forming marks over at least a portion of the first communication printed on the substrate. Regardless of the form of the alteration, at least a portion of the code printed on the communication in step (52) remains on the communication after the step (54) alteration.

Referring to step (56), the second communication and identifier code are digitized. Such digitization can be accomplished utilizing the scanning machine 28 of FIG. 1. Information is extracted from the digitized identifier code with a processor which is in data communication with the database of step (50). The processor is configured to utilize the extracted information to retrieve the first communication from the database.

Referring to step (58), the digitized second communication is compared with the first communication to identify differences between the second communication and the first communication.

Referring to step (60), a third communication is formed from a combination of the first and second communications. In one method of forming the third communication, software is utilized to identify differences between the first and second communications, and the differences are comprised by the third communication. The third communication can be sent to an output device (step (62)) to display the differences between the first and second communications. In applications wherein the first and second communications comprise text, the differences between the first and second communications can be displayed by, for example, redline or strike-through font.

Another method of forming the third communication of step (60) is to electronically merge at least a portion of data corresponding to the first communication with at least a portion of the digitized second communication. In applications in which the second communication differs from the first communication by having additional markings provided thereon, the electronic merging can comprise, for example, combining the additional markings with the first communication to form the third communication.

Referring to step (62), the third communication is sent to an output device to display the third communication. Suitable output devices can comprise, for example, printers or computer terminals.

Referring to FIG. 3, another embodiment of the invention is described. In step (70), multiple versions of a communication are stored on a database as, for example, data sets. Each version of the communication corresponds to a separate data set. Each data set has a version specific identifier code associated therewith, and the version specific identifier codes are different for the different versions of the communication. Each data set also has a communication specific identifier code associated therewith, and the communication identifier code is the same for all versions of the communication.

Referring to step (72), a hard copy of one of the versions of the communication is produced by printing the version of the communication on a substrate. The hard copy includes the communication specific code and the version specific code associated with the data set corresponding to the communication. The codes are preferably printed in machine-readable form.

Referring to step (74), the codes printed on the hard copy version of the communication are provided to a processor. Such can be accomplished by, for example, reading the codes with a machine (such as, for example, the machine 28 of FIG. 1) configured to interpret the codes.

Referring to step (76), the processor is configured to recognize that multiple versions of the printed communication are in the database and to selectively retrieve one of the multiple versions for subsequent display.

In further embodiments, the processor can be utilized to generate a difference document which shows differences between the version of the document extracted by the processor, and that which correspond to the hard copy. In other embodiments, the processor can be configured to automatically extract a most recently formed version of the document from the database.

Another embodiment of the invention is described with reference to FIG. 4. In step (80), multiple versions of a communication are stored in a database. Each of the versions has a document specific code associated with it in the database and a version specific code associated with it in the database. The document specific code is the same for all of the versions of the document and the version specific code is different for each version of the document.

Referring to step (82), one of the multiple versions of the communication is printed with its identifier code to form a hard copy of the communication. Preferably, the identifier code is printed in machine-readable format. The printed version can be referred to as a first version of the communication.

Referring to step (84), the identifier code of the printed version of the communication is provided to a processor. Such can be accomplished by, for example, reading the preferred machine-readable identifier code with a scanning device (such as, for example, the scanning device described above with reference to FIG. 1).

Referring to step (86) the processor is utilized to extract at least a portion of a version of the communication from the database, and the version extracted from the database is different than the version printed as the hard copy. The version extracted from the database can be referred to as a second version of the communication.

In particular applications, the processor can be configured to recognize that first and second versions of the communications are stored on the database and to prompt at user to select which of the multiple versions is to be extracted from the database. Further, the processor can be configured to send the extracted version of the communication to an output device to display the extracted version.

In further embodiments, the first version can comprise a plurality of sub-components, such as, for example, text and graphs. The second version can also comprise a plurality of sub-components. At least one of the sub-components of the second version can be different from the sub-components of the first version. Further, the sub-components can have identifier codes associated therewith in the first version data set, and the second sub-components can also have identifier codes associated therewith in the second version data set. The processor can then be configured to utilize the first and second sub-component identifier codes to retrieve and compare sub-components of the first and second version data sets, and to identify any sub-components of the second version which are different from sub-components of the first version, or vice versa. The processor can be further configured to prompt a user with an indication of which of the sub-components of the second version are different from those of the first version, or vice versa.

What is claimed is:

1. A method of storing and retrieving information, comprising:
    storing multiple versions of a communication in a database, the storing multiple versions comprising:
        creating a first version of the communication;
        saving the first version of the communication to the database as a first data set, the saving utilizing software configured to save a first identifier code in the database associated with the first version of the communication;
        fetching the first version of the communication from the database and changing at least a portion of the first version of the communication to form a second version of the communication; and
        saving the second version of the communication to the database as a second data set, the saving utilizing software configured to save a second identifier code in the database associated with the second version of the communication;
    publishing at least a portion of the first version of the communication together with the first identifier code; and
    retrieving a selected one of the first and second versions of the communication from the database, the retrieving the selected one of the versions comprising:
        providing the published first identifier code to a processor having data communication with the database, the processor being configured to utilize the first and second identifier codes to retrieve and compare the first and second data sets, the processor being further configured to recognize that multiple versions of the communication were saved to the database as multiple data sets and to prompt a user to select which of the multiple versions is to be displayed; and
        utilizing the processor to send at least a portion of a selected one of the first and second data sets to an output device and to thereby display at least a portion of the selected one of the multiple versions of the communication stored on the database.

2. The method of claim 1 wherein the first communication comprises a plurality of sub-components, wherein the second communication comprises a plurality of sub-components, and wherein the sub-components correspond to one or more of graphics, text or finishing processes for the first and second communications, the method further comprising:
    utilizing the software to save first sub-component identifier codes which identify at least some of the sub-components within the first communication data set; and
    utilizing the software to save second sub-component identifier codes which identify at least some of the sub-components within the second communication data set.

3. The method of claim 1 wherein the first communication comprises a plurality of sub-components, and wherein the second communication comprises a plurality of sub-components, at least one of the sub-components of the second communication being different than the sub-components of the first communication, the method further comprising:
    utilizing the software to save first sub-component identifier codes which identify at least some of the sub-components within the first communication data set;
    utilizing the software to save second sub-component identifier codes which identify at least some of the sub-components within the second communication data set;
    the processor being configured to utilize the first and second sub-component identifier codes to retrieve and compare sub-components of the first and second communication data sets, and to identify the at least one sub-component of the second communication that is different from the sub-components of the first communication, the prompting the user indicating which of the sub-components of the second communication sub-components are different than the first communication sub-components; and
    the displaying at least a portion of one of the first and second data sets comprising displaying the sub-component of the second communication that is different from the sub-components of the first communication.

4. The method of claim 1 wherein the providing the published first identifier code to a processor comprises one or more of voice input to the processor, tactile input to the processor, or scanned machine-readable code input to the processor.

5. The method of claim 1 further comprising:
    utilizing the processor to generate a difference document from the selected communication, the difference document showing the differences between the first and second communications; and
    the displaying at least a portion of the selected one of the two versions of the communication comprising displaying the difference document.

6. The method of claim 1 wherein the sending the portion of the selected one of the first and second communications to an output device comprises sending said selected portion to e-mail, a web page or a printed hard copy.

7. The method of claim 1 wherein:
    the first and second communications comprise multiple sub-components which can be independently updated;

the multiple sub-components have different component-identifying codes stored on the database to identify the sub-components and the versions of the sub-components;

the published first communication having some component-identifying codes provided thereon which identify the sub-components displayed on the published first communication and the versions of such displayed sub-components;

the published component-identifying codes of the published first communication being provided to the processor together with the published first identifier code; and the processor being configured to detect if multiple versions of one or more sub-components are stored in the database.

8. The method of claim 7 further comprising:

the prompt from the processor to the user indicating if the processor detects that multiple versions of one or more sub-components are stored in the database; and the input from the user to the processor indicating which of the multiple versions of the of the one or more sub-components is to be displayed with the selected communication.

9. A method of document retrieval, comprising:

providing a database having multiple versions of a document stored therein as data sets, the multiple versions having a common document specific code associated therewith in the database and having different version specific codes;

forming a hard copy of one of the versions of the document, the hard copy version being defined as a first version of the document, the hard copy having the common document specific code provided thereon in machine-readable format and having the version specific code provided thereon in machine-readable format;

reading the machine-readable format with a code-reading machine configured to extract the document specific code and version specific code from the machine-readable format;

providing the document specific code and version specific code extracted by the machine to a processor in data communication with the database, the processor being configured to extract at least a portion of a second version of the document from a data set corresponding to the second version of the document, wherein the second version is different than the first version;

sending a prompt from the processor to a user when the processor detects that multiple versions of the document are stored in the database; and providing input from the user to the processor to indicate which of the multiple versions of the document is to have at least a portion extracted from the database.

10. A method of document retrieval, comprising:

providing a database having multiple versions of a document stored therein as data sets, the multiple versions having a common document specific code associated therewith in the database and having different version specific codes;

forming a hard copy of one of the versions of the document, the hard copy version being defined as a first version of the document, the hard copy having the common document specific code provided thereon in machine-readable format and having the version specific code provided thereon in machine-readable format;

reading the machine-readable format with a code-reading machine configured to extract the document specific code and version specific code from the machine-readable format;

providing the document specific code and version specific code extracted by the machine to a processor in data communication with the database, the processor being configured to extract at least a portion of a second version of the document from a data set corresponding to the second version of the document, wherein the second version is different than the first version;

the documents comprise multiple sub-components which can be independently updated;

the multiple sub-components have different component-identifying codes stored on the database to identify the sub-components and the versions of the sub-components;

the hard copy has some component-identifying codes provided thereon in machine-readable code which identify the sub-components displayed on the hard copy and the versions of such displayed sub-components;

the machine-readable code of the component-identifying codes on the hard copy is read by the code-reading machine;

the processor is configured to determine if different versions of any of the sub-components displayed on the hard copy are in the database; and the extracted portion of the document corresponds to at least one sub-component.

11. The method of claim 10 further comprising:

sending a prompt from the processor to a user when the processor detects that multiple versions of one or more sub-components are stored in the database; and providing input from the user to the processor to indicate which of the multiple versions of the of the one or more sub-components is to be extracted from the database.

* * * * *